(12) United States Patent
Anselmo et al.

(10) Patent No.: US 6,324,381 B1
(45) Date of Patent: *Nov. 27, 2001

(54) METHOD AND SYSTEM FOR COMMUNICATING HIGH RATE DATA IN A SATELLITE-BASED COMMUNICATIONS NETWORK

(75) Inventors: Carl S. Anselmo; Sam W. Houston, both of Rancho Palos Verdes; Daniel P. Sullivan, Palos Verdes Estates, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/634,261

(22) Filed: Aug. 8, 2000

Related U.S. Application Data

(62) Division of application No. 08/867,672, filed on Jun. 2, 1997, now Pat. No. 6,125,261.

(51) Int. Cl.[7] .................................................. H04B 7/185
(52) U.S. Cl. .......................... 455/12.1; 455/427; 370/316
(58) Field of Search ................................ 455/8–10, 12.1, 455/13.1, 427, 428, 429; 370/316, 319, 321; 342/357.16

(56) References Cited

U.S. PATENT DOCUMENTS

| | | | | |
|---|---|---|---|---|
| 4,358,770 | * | 11/1982 | Satoh et al. | 343/786 |
| 4,792,963 | * | 12/1988 | Campanella et al. | 455/12.1 |
| 5,038,150 | * | 8/1991 | Bains | 342/373 |
| 5,367,304 | * | 11/1994 | Jan et al. | 455/427 |
| 5,422,647 | * | 6/1995 | Hirshfield et al. | 342/354 |
| 5,495,258 | * | 2/1996 | Muhlhauser et al. | 343/753 |
| 5,602,838 | * | 2/1997 | Kartalopoulos | 370/319 |
| 5,625,624 | * | 4/1997 | Rosen et al. | 455/12.1 |
| 5,713,075 | * | 1/1998 | Threadgill et al. | 455/427 |
| 5,722,042 | * | 2/1998 | Kimura et al. | 455/13.1 |
| 5,722,049 | * | 2/1998 | Hassan et al. | 455/10 |
| 5,781,540 | * | 7/1998 | Malcolm et al. | 370/321 |
| 5,796,715 | * | 8/1998 | Patterson et al. | 455/12.1 |
| 5,815,809 | * | 9/1998 | Ward et al. | 455/428 |
| 5,825,325 | * | 10/1998 | O'Donovan et al. | 455/13.1 |
| 5,835,128 | * | 11/1998 | Macdonald et al. | 348/8 |
| 6,125,261 | * | 9/2000 | Anselmo et al. | 455/12.1 |

* cited by examiner

Primary Examiner—Nay Maung
(74) Attorney, Agent, or Firm—Vijayalakshmi D. Duraiswamy; Michael W. Sales

(57) ABSTRACT

A satellite-based communications system operating at high data rates includes a plurality of communications satellites each having an uplink and a downlink antenna for receiving and transmitting a plurality of spot beams corresponding to a plurality of coverage areas at a plurality of frequencies. The system further includes a plurality of dedicated communications links between a source location in one of the plurality of coverage areas and a destination location in another one of the plurality of coverage areas wherein the plurality of dedicated communications links are each assigned an exclusive time interval for transmitting and receiving communications signals to and from each of the plurality of satellites. The plurality of satellites each have an uplink and downlink antenna beam switch coupled to the uplink and downlink antennas for selecting a reconfigurable subset of the plurality of spot beams based on the time interval. The plurality of satellites each further have a primary communication payload for receiving and transmitting signals at a primary range of frequencies in each of the plurality of spot beams and a secondary communication payload for receiving and transmitting signals at a secondary range of frequencies in each of the plurality of spot beams upon occurring a drop-out of the primary communication payload. The system further includes a plurality of user terminals having a primary communication antenna for transmitting and receiving signals to and from each of the plurality of satellites at the primary range of frequencies.

30 Claims, 3 Drawing Sheets

METHOD AND SYSTEM FOR COMMUNICATING HIGH RATE DATA IN A SATELLITE-BASED COMMUNICATIONS NETWORK

CROSS-REFERENCE TO RELATED APPLICATIONS

This is a division of application Ser. No. 08/867,672 filed Jun. 2, 1997 now U.S. Pat. No. 6,125,261.

This invention is related to co-pending application Ser. No. 08/867,197 filed Jun. 2, 1997 entitled "Method And System For Providing Wideband Communications To Mobile Users In A Satellite-Based Network," having the same assignee as the present invention, and which is hereby incorporated by reference.

TECHNICAL FIELD

This invention relates to methods and systems for communicating high rate data to customers in a satellite-based communications networks.

BACKGROUND ART

A number of applications continue to drive the need for high speed data transport. Industry specific examples include remote film editing, medical image transport, and financial service data consolidation and backup. Business communications and training needs further accelerate information transfer needs across all sectors. As business, government and educational institutions disseminate more information, greater importance is attached to data transfer. In this environment, reliable, high speed video and data transport becomes even more critical.

Furthermore, a tremendous growth in Internet traffic has caused a strain on the capacity of telephony networks. Network shortcomings include network outages, insufficient access bandwidth, and insufficient internode bandwidth. Currently, providers need to make significant investments, as well as experience installation delays, to upgrade network infrastructure, yet they cannot pass the costs on to the end users.

Corporate LANs/WANs also generate an insatiable demand for higher bandwidth. The demand for bandwidth goes up as more and more users are connected. The users, in turn, demand more services and improved network speed. Personal computers are being used to process not only text, but graphics and video as well., all on networks that are increasingly global. Widespread implementation of corporate intranets and extranets further drive the move to increased bandwidth applications. High speed networking is also driven by the growth of video distribution, client/server technology, decentralized systems, increased processing power and developments in storage capacity.

Thus, it is important to relieve congestion among the heavily used communications links in high-density areas and to bring such service to isolated rural ares which have not been able to participate fully in the communications world. While existing satellite systems offer ubiquitous service, they do not offer direct connection to the end user at moderate to high data rates. Existing Fixed Satellite Service (FSS) systems employ wide channel bandwidths and relatively large beamwidths making them more suited to point-to-point trunking service rather than to end user connectivity. The wide area coverage, limited Equivalent Isotropically Radiated Power (EIRP), and constrained flexibility of these systems makes any attempt to serve many small users both inefficient and costly.

The emerging cellular type satellite services serve a very large number of potential subscribers but only at very low data rates. The on-board processing and packet-switched nature of their signal structure severely limits the practical user data rates that can be accommodated within the technology limitations of the processor. Thus, there exists a need for a satellite communications system that serves the demand for high data rate business users including the high end individual as well as small business users that demand direct and affordable connection.

DISCLOSURE OF THE INVENTION

It is thus a general object of the present invention to provide a satellite-based communications network providing reliable high data rate communications service to customers throughout the world.

In carrying out the above objects and other objects, features, and advantages of the present invention, a satellite-based communications network provides wideband data communications service to subscribing customers. The system includes a plurality of communications satellites each having an uplink and a downlink antenna for receiving and transmitting a plurality of spot beams corresponding to a plurality of coverage areas at a plurality of frequencies. The system further includes a plurality of dedicated communications links between a source location in one of the plurality of coverage areas and a destination location in another one of the plurality of coverage areas wherein the plurality of dedicated communications links are each assigned an exclusive time interval for transmitting and receiving communications signals to and from each of the plurality of satellites. The plurality of satellites each have an uplink and downlink antenna beam switch coupled to the uplink and downlink antennas for selecting a reconfigurable subset of the plurality of soot beams based on the time interval. The plurality of satellites each further have a primary communication payload for receiving and transmitting signals at a primary range of frequencies in each of the plurality of spot beams and a secondary communication payload for receiving and transmitting signals at a secondary range of frequencies in each of the plurality of spot beams upon occurring a drop-out of the primary communication payload. The system further includes a plurality of user terminals having a primary communication antenna for transmitting and receiving signals to and from each of the plurality of satellites at the primary range of frequencies..

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
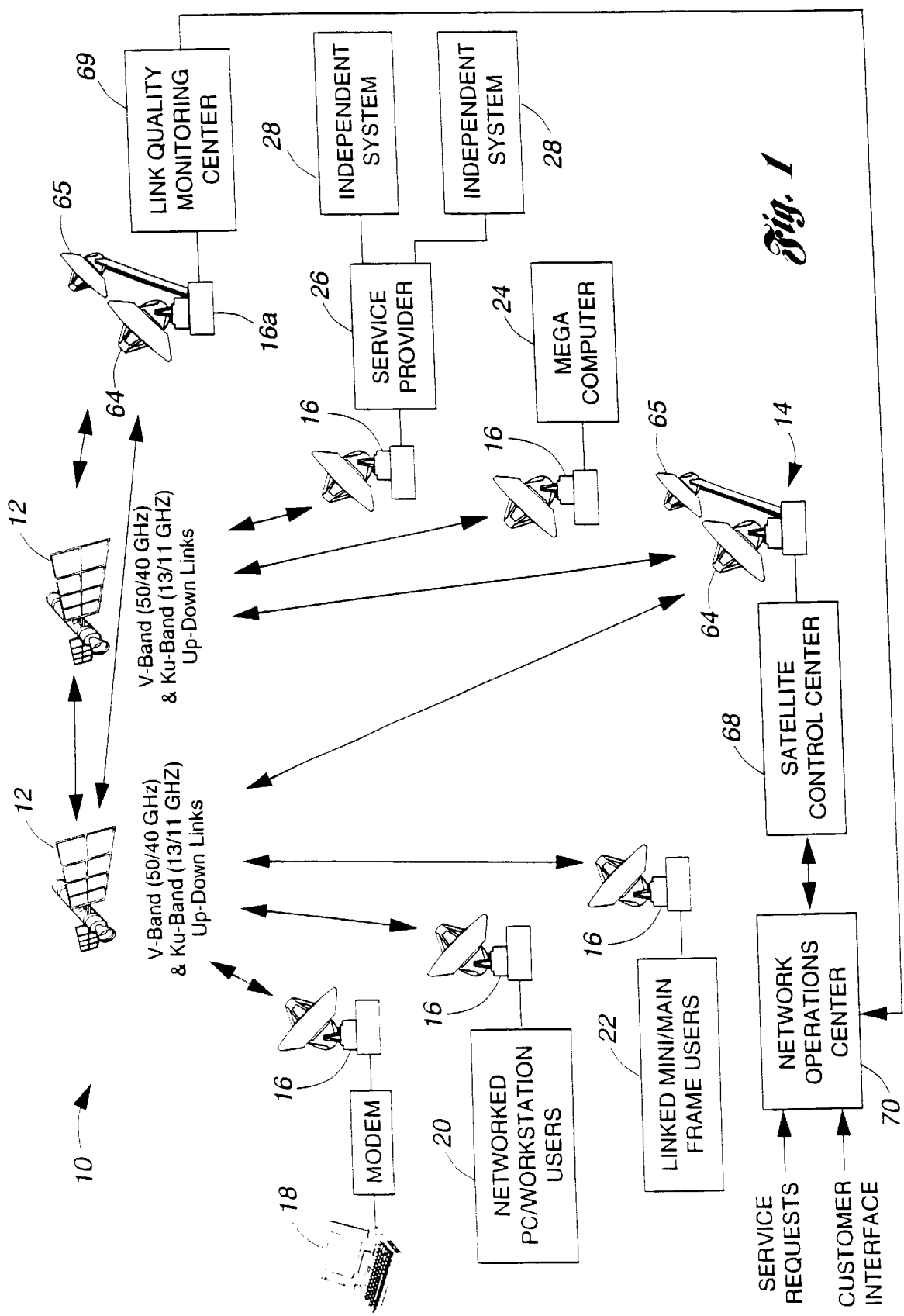
FIG. 1 is a diagrammatic representation illustrating a satellite communication system of the present invention.

Referring first to FIG. 1, a satellite-based communications network 10 with a typical geometry for practicing the present invention is diagrammatically illustrated. In general, the network 10 includes a plurality of communications satellites 12 in geosynchronous orbit or medium earth orbit or low earth orbit, a ground station 14 for controlling and maintaining operation of each of the plurality of satellites 12, and a plurality of user terminals 16. The user terminals 16 may interconnect with a single computer 18, a group of networked PC/Workstation users 20, a group of linked mini/main frame users 22, a mega computer 24, or a service provider 26 that provides service to any number of independent systems 28.

The geosynchronous satellites 12 are positioned in orbit locations supporting Fixed Satellite Service (FSS) coverage for domestic service and accommodating a primary range of frequencies and a secondary range of frequencies, such as 50/40 GHz V-band as well as 13/11 GHz Ku-band operation. The locations of satellites 12 must accommodate emissions along with other co-orbiting satellites, and must support service to and from high population metropolitan and business areas throughout the world. The ground terminal elevation angles to satellites 12 must be 30 degrees or greater to minimize adverse propagation effects especially in the presence of rain and other disturbances. The preferred orbit locations include four satellites over the U.S., two each at 99° W and 103° W. To accommodate global growth and provide coverage to western Europe, central Europe, Middle East, and Africa, the preferred orbit locations further include eight other satellites, two each at 10° E and one at 63° W, 53° W, 48° E, 63.5° E, 115.4° E, and 120.6° E.

Figure 2:
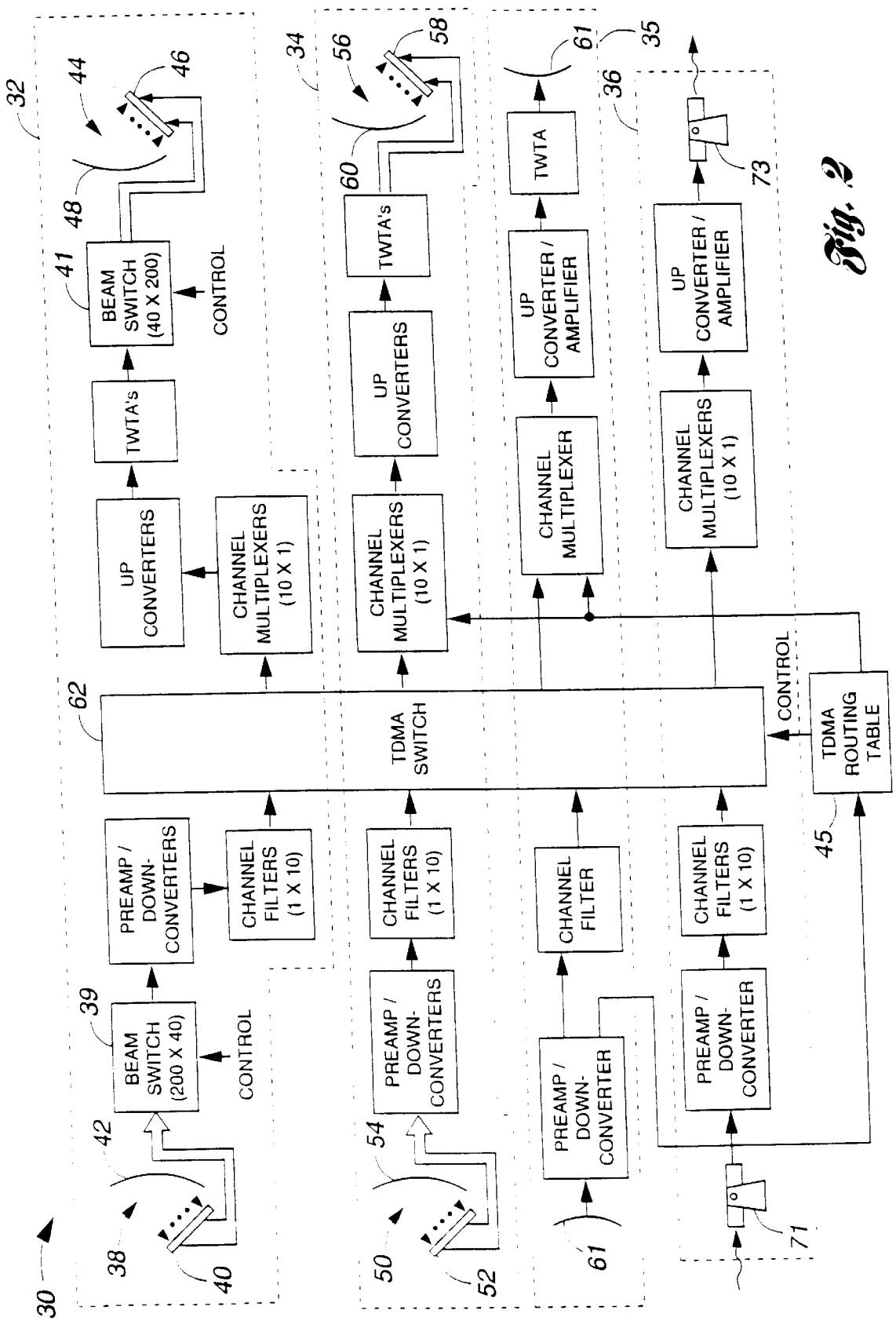
FIG. 2 is a schematic block diagram illustrating a communications subsystem within the satellites of the present invention.

Each of the satellites 12 are high power satellites having 15–20 KW payload capability, such as an HS 702L High Power Spacecraft manufactured by Hughes Electronics Corporation, the assignee of the present invention. The HS 702L is a three-axis body-stabilized spacecraft that uses a five panel solar array system, along with outboard radiator panels attached to the main body to dissipate heat generated from the high powered Traveling Wave Tubes (TWTs). A schematic block diagram illustrating a communications subsystem, or payload, 30 within satellites 12 is shown in FIG. 2.

The payload 30 includes a primary communication payload 32, a secondary communication payload 34, an interhemisphere link 35, and an intersatellite link 36. Primary communication payload 32 supports the majority of the communications signals. Secondary communication payload 34 is utilized for thin route satellite traffic and as back-up for weather outages of primary communication payload 32. Primary communication payload 32 operates preferably in the 50/40 GHz FSS region, or any other similar high frequency range, to provide high capacity service and utilizes 3 GHz of spectrum (47.2 to 50.2 GHz) for uplinks and another 3 GHz of spectrum (38.6 to 41.6 GHz) for downlinks. Data rates from 1.544 Mbps (equivalent to T1) to 155 Mbps (OC3 equivalent) can, thus, be supported. Users operating at data rates below the T1 level can be accommodated by submultiplexing the signals at the user terminal 16. Secondary communication payload 34 preferably operates in the 13/11 Ku-band FSS region with 500 MHz of bandwidth width to provide ubiquitous thin route and high link availability service and connection between the northern and southern hemispheres.

Primary communication payload 32 includes an uplink antenna 38 and a downlink antenna 44 for receiving and transmitting spot beams carrying signals at the primary range of frequencies. Narrow spot beams allow a greater power to be received and transmitted in the area it covers, thereby supporting higher data rates than those of wider beams. A single antenna can produce many spot beams. Many small feed horns are positioned so that their signals are reflected in narrow beams by a parabolic dish of the antenna. Different antenna feeds are switched on and off, via uplink antenna beam switch 39 and downlink antenna beam switch 41, thereby selecting the spot beam to be used in each case. Not only do satellites with multiple narrow beam antennas give a higher EIRP per beam, but the same frequency and bandwidth can also be reused several times for different portions of the earth. Even further, if the spot beams also have dual polarization capability, the number of beams is doubled, thereby increasing spectral reuse also by a factor of two. For example, for twenty spot beams each with dual polarization, the spectral reuse if forty times.

Figure 3:
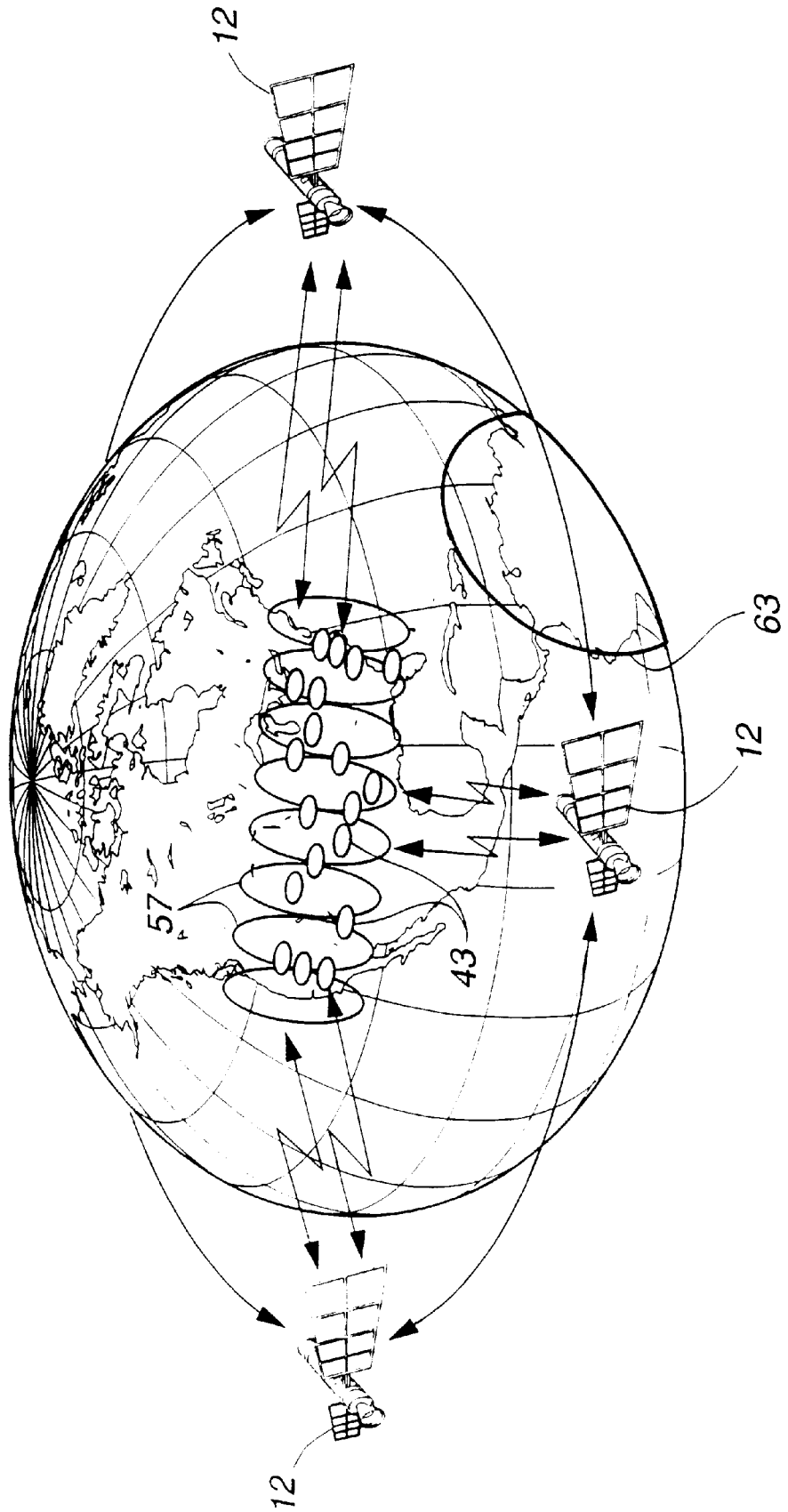
FIG. 3 is a schematic illustration of the constellation of communications satellites utilized in the present invention.

In the present invention, a surface, or area, such as CONUS, to receive communications services of the present invention, is divided into a plurality of coverage areas 43, as shown in FIG. 3. Uplink and downlink antennas 38,44, respectively, can support a predetermined number of coverage areas 43, e.g., 200. However, a subset of the plurality of coverage areas 43 is chosen to be used by uplink and downlink antennas 38,44, respectively, to support communications services in predetermined metropolitan areas having heavy traffic This configuration is controlled by a routing table 45 stored on the payload 30. Thus, the spot beams 43 are semi-fixed in position, until reconfigured at a later time. Reconfiguration of uplink and downlink antenna beam switches 39,41, respectively, is possible by updating routing table 45 as needed. This updated information is transmitted by ground station 14. Thus, usage of available satellite resources, such as weight and power, are utilized for only those beams that are selected and active.

Preferably, uplink antenna 38 and downlink antenna 44 each consists of an east-mounted and a west-mounted multifeed antenna assembly having a multibeam array 40,44 and a reflector 42,48 to provide CONUS and coastal coverage. The offset parabolic reflectors 42,48 are deployed from the east and west side of the satellite 12, yet the feed arrays 40,44 are fixed to the nadir face and do not deploy. Each reflector 42,48 is populated by a fifty-one horn dual circularly polarized feed array 40,44. Each horn of the feed array 40,44 is diplexed for both transmit and receive frequencies. In addition, each horn provides either a single sense of circular polarization or dual circular polarization. Consequently, there are 400 total input ports to the 200 horns that comprise the antenna assemblies 38,44. Alternatively, uplink and downlink antennas 38,44 may comprise a phased array antenna.

As discussed above, antenna beam switches 39, 41 select twenty spot beams from the 200 horn array, each with dual circular polarization to provide forty beams per satellite. Each beam and each polarization makes full use of the 3 GHz of spectrum with a total of forty times spectrum reuse (120 GHz) in all. The selected forty spot beams 43 are directed towards major metropolitan population centers and business areas included within the ubiquitous area, as shown in FIG. 3. In addition, any twenty beams included in the uplink array of receive beam locations and any twenty of the array of downlink beam locations can be selected independently of each other on orbit to accommodate variations in traffic or satellite relocation at a later date.

Each beam is divided into ten Frequency Division Multiple Access (FDMA) channels, with each channel nominally 300 MHz wide, including guard bands. Each FDMA channel is divided into 100 Time Division Multiple Access (TDMA) channels, with each TDMA channel having a nominal burst rate of 150 Mbps. Thus, a total of 100 users may use the same frequency channel in the same beam. Upon subscribing to the service provided by the network 10 of the present invention, a dedicated communications link is assigned to a user at a source location in one of the coverage areas 43 and a user at a destination location in another one of the coverage areas 43. This dedicated link is assigned an exclusive time channel in one of the frequency channels for transmitting and receiving communications signals.

Satellite payload 30 includes a Time Division Multiple Access (TDMA) circuit switch 62 operating at a suitable intermediate frequency (IF). Circuit switch 62, driven by routing table 45, provides interlinking of all beams, services and users and dedicated point-to-point and point-to-multipoint services. Circuit switch 62 circuit switches signals to be transmitted either to the same uplink beam as the source signal was transmitted from or by another downlink beam based on the time interval assigned the source signal according to routing table 45. Circuit switch 62 is gated within the time domain to provide precise windows of time to different desired outputs. Loopback information is included within the transmission to provide necessary synchronization of user terminals 16 with the satellites 12. Circuit switch 62 also routes crosslink traffic as well as traffic to and from the hemispheric coverage beam, discussed below.

As with primary communication payload 32, secondary communication payload 34 includes an uplink antenna 50 having a multibeam array 52 and a reflector 54, and a downlink antenna 56 having a corresponding multibeam array 58 and reflector 60. Secondary communication coverage is preferably provided by two nadir-mounted dual-gridded reflector antennas, each illuminated by eight diplexed feeds for transmit and receive frequencies. Secondary communication antennas 50,56 provide a total of eight dual polarized, elliptical area (3°×1°) coverage beams 57, as shown in FIG. 3, for uplink and downlink services. Thus, secondary communication payload 34 provides an eight-fold reuse of the spectrum for a total useable bandwidth of 4 GHz.

To provide for inter-hemisphere interconnectivity, inter-hemisphere link 35 includes a single steerable horn 61, diplexed for transmit and receive frequencies providing one dual linearly polarized spot beam for uplink and downlink services. Horn 61 transmits a 6°×6°, 13/11 GHz area beam 63 towards the southern hemisphere, allowing thin route coverage of southern regions such as South America, as shown in FIG. 3. This beam may also provide north-south interconnection coverage to areas such as Europe and Africa.

Intersatellite link 36 is included so that traffic from one satellite covering a particular region or selected metropolitan areas can be linked to a second satellite covering the same or other areas and regions. Intersatellite link 36 may be an optical (or laser) link operating in the 1.6 micron region via two 9 inch laser-telescope assemblies 71,73. Alternatively, intersatellite link 36 may be a radio frequency (RF) link operating in the 60 GHz region. Data is frequency converted and multiplexed to provide a maximum 3 Gbps data rate for inter-satellite connectivity.

Returning to FIG. 1, user terminals 16 include a primary antenna 64 for communicating with each of the satellites 12 in the primary range of frequencies, such as V-band frequencies. Thus, user terminals support data rates between 1.544 Mbps (equivalent to T1) and 155 Mbps (OC3 equivalent) via V-band antenna 64. Data rates below T1 are accommodated at user terminals 16 by submultiplexing the data to T1 (or higher) rates before transmission. Each of the user terminals 16 time-share the FDMA channels, with 100 TDMA channels in each 300 MHz FDMA channel. Since each TDMA channel supports a data rate of 1.544 Mbps, the network 10 provides a data throughput rate of 1.544 Gbps (100×1.544 Mbps×10) for each of the forty effective beams per satellite 12. For each FDMA channel, the channel data rate is 274.8 Mbps, which includes overhead for coding, transport protocol, network signaling, and access management. Uplink operation at each of the user terminals 16 operates in a burst mode at a data rate determined by the full FDMA channel plan.

Thirty watt high power amplifiers (HPA's) operate at saturation in the user terminals 16, with the user terminals 16 in each beam operating time shared on one of ten unique carrier frequencies. Out of band emissions are minimized in each user station 16. Each of the forty 3.0 GHz bandwidth beams is received and down converted, routed through circuit switch 62, upconverted, and amplified by a TWTA associated with a particular downlink beam. The downlink beams each have ten carriers, one for each FDMA channel. Each TWTA uses linearizers and operates with sufficient output backoff to ensure minimum out of band emissions and intermodulation products.

User terminals 16*a* that cannot tolerate the expected loss of transmission due to weather outages further include a secondary communication antenna 65 for transmitting and receiving signals at the secondary range of frequencies. Secondary communication antenna 65 may or may not be the same as the primary communication antenna 64. User terminals 16*a* subscribing to this type of service include a link quality monitoring center 69 to monitor the quality of service of primary communication payload 32 and routes it to a higher quality link, i.e., secondary communication payload 34, in the presence of adverse link propagation disturbance. The rerouting of traffic to a higher availability link is accomplished by communicating such conditions to ground station 14.

As discussed above, each of the satellites 12 are also in communication with a ground station 14. Ground station 14 has two functions. Satellite control center 68 manages the health and status of all the satellites 12 and maintains their orbits. If rain attenuation exceeds the link budget allocation at the primary range of frequencies, e.g., 50/40 GHz, the satellite 12 shall be commanded by satellite control center 68 to provide service via the secondary communication payload 34 until the weather front passes, at which time the satellite 12 is restored to primary services. Secondary communication payload 34 resource is then free to backup another metropolitan area, if needed, or to provide ubiquitous thin route services over CONUS. To be an effective backup, secondary communication payload 34 must have a sufficient capacity, on the order of 10% of the primary communication payload 32, in order to backup the entire service.

Network operations center 70 of ground station 14 provides resource management, fault management, accounting, billing, customer interfacing, and service. Ground station 14 is preferably placed in low-rain sections of friendly countries so as to provide line-of-sight communications with each of the satellites 12.

The network of the present invention provides communications capabilities that will significantly contribute to the National and Global Information Infrastructures. It provides high data rate communications to customers throughout the United States and most of the rest of the world as well. The system provides true broadband capability, including high speed access to the Internet in particular and high-technology telecommunications in general. The innovative design of the system insures that this capability can be provided at a much lower cost than installing fiber, thereby taking advantage of the distance insensitivity of satellite-based service. It is also particularly attractive at making first and last mile connections, which is a problem with the present copper and optical fiber cable systems.

While the best modes for carrying out the invention have been described in detail, those familiar with the art to which this invention relates will recognize various alternative designs and embodiments for practicing the invention as defined by the following claims.

What is claimed is:

1. A system for providing high frequency data communications in a satellite-based communications network, the system comprising:
    a plurality of communications satellites (12) each having uplink and downlink antennas (38,44) capable of receiving and transmitting a plurality of signals utilizing spot beams to a plurality of coverage areas (43) at a predetermined range of frequencies, the plurality of satellites (12) each further having uplink and downlink antenna beam switches (39,41) coupled to the uplink and downlink antennas (38,44) respectively for selecting a reconfigurable subset of the plurality of coverage areas (43) so as to provide satellite communications to a subset of the plurality of coverage areas (43), and the plurality of satellites (12) each having a primary communication payload (32) for receiving and transmitting signals at a primary range of frequencies in each of the plurality of coverage areas (43) in the subset and a secondary communication payload (34) for receiving and transmitting signals at a secondary range of frequencies in each of the plurality of coverage areas (43) in the subset upon drop-out of the primary communication payload (32);
    a plurality of dedicated communications links between a source location in one of the plurality of coverage areas (43) and a destination location in another one of the plurality of coverage areas (43), the plurality of dedicated communications links each being assigned an exclusive time interval for transmitting and receiving communications signals to and from each of the plurality of satellites (12); and
    a plurality of user terminals (16) disposed in the plurality of source locations and destination locations for transmit-ting and receiving signals to and from each other via the plurality of communications satellites (12) utilizing one of the plurality of dedicated communications links, and each of the plurality of user terminals (16) having a primary communication antenna (64) for transmitting and receiving signals to each of the plurality of satellites (12) at the primary range of frequencies.

2. The system as recited in claim 1 wherein each of the plurality of satellites further comprise a switch for circuit switching the signals received at one of the uplink antennas to a corresponding one of the downlink antennas based on the time interval.

3. The system as recited in claim 2 wherein the switch is a Time Division Multiple Access (TDMA) switch.

4. The system as recited in claim 3 wherein each of the user terminals are synchronized to the TDMA switch via synchronization signals transmitted by each of the plurality of satellites.

5. The system as recited in claim 2 wherein each of the plurality of satellites include a routing table for storing time interval data identifying each of the plurality of dedicated communications links for driving the uplink and downlink antenna beam switches and the circuit switch.

6. The system as recited in claim 5 further comprising a ground station for transmitting and receiving signals to and from each of the plurality of communications satellites for monitoring and controlling each of the plurality of satellites.

7. The system as recited in claim 6 wherein the ground station transmits signals to each of the plurality of satellites for updating the routing table for use in reconfiguring the subset of the plurality of coverage areas and for use in driving the circuit switch.

8. The system as recited in claim 7 wherein at least one of the user terminals further comprise a secondary communication antenna for transmitting and receiving signals to and from each of the plurality of satellites at the secondary range of frequencies.

9. The system as recited in claim 8 wherein the at least one of the user terminals further comprising a link monitoring system for monitoring performance of the primary communication payload and generating a link performance signal upon occurring a drop-out in the primary communication payload.

10. The system as recited in claim 9 wherein the ground station is in electrical communication with the at least one of the user terminals and transmits a link signal to one of the plurality of satellites instructing the one of the plurality of satellites to transmit communications signals to the at least one of the user terminals at the secondary range of frequencies based on the performance signal generated by the at least one of the user terminals.

11. The system as recited in claim 10 wherein each of the plurality of satellites monitors performance of the primary communication and automatically transmits signals at the second range of frequencies upon occurring a drop-out in the primary communication payload.

12. The system as recited in claim 1 wherein each of the plurality of spot beams carry two orthogonally polarized signals.

13. The system as recited in claim 1 wherein the plurality of satellites are positioned in a geosynchronous orbit.

14. The system as recited in claim 1 wherein the plurality of satellites are positioned in one of a medium earth orbit and a low earth orbit.

15. The system as recited in claim 1 wherein the uplink and downlink antennas are multi beam array antennas.

16. The system as recited in claim 1 wherein the uplink and downlink antennas are phased array antennas.

17. The system as recited in claim 1 wherein the primary range of frequencies is the V-band of frequencies.

18. The system as recited in claim 17 wherein the secondary range of frequencies is the Ku-band of frequencies.

19. The system as recited in claim 1 wherein each of the plurality of satellites (12) further comprises an intersatellite link (36) for communicating with each of the other plurality of satellites (12) and wherein the intersatellite link (36) is an optical link.

20. The system as recited in claim 1 wherein each of the plurality of satellites (12) further comprises an intersatellite link (36) for communicating with each of the other plurality of satellites (12) and wherein the intersatellite link (36) is a radio frequency link.

21. The satellite-based global communications network system of claim 1, wherein at least one of said plurality of dedicated communications links includes an interhemisphere link for providing interhemispheric interconnection coverage.

22. The system of claim 21 wherein the interhemisphere link includes a single steerable horn which is diplexed for transmit and receive frequencies and providing one dual linearly polarized spot beam for uplink and downlink services.

23. The system of claim 22 wherein said horn transmits a 6°×6°, 13/11 GHz area beam towards the southern hemisphere, allowing thin route coverage of southern regions of the hemisphere.

24. The system of claim 21 further comprising a circuit switch for routing traffic to and from said interhemisphere link.

25. In a satellite-based communications network including a plurality of communications satellites (12) each having uplink and downlink antennas (38,44) capable of receiving and transmitting a plurality of signals utilizing spot beams to a plurality of coverage areas (43), the plurality of satellites (12) each further having uplink and downlink antenna beam switches (39,41) coupled to the uplink and downlink antennas (38,44) respectively for selecting a reconfigurable subset of the plurality of coverage areas (43) so as to provide satellite communications to a subset of the plurality of coverage areas (43), the network further including a plurality of dedicated communications links between a source location in one of the plurality of coverage areas (43) and a destination location in another one of the plurality of coverage areas (43) and a plurality of user terminals (16) for transmitting and receiving signals to and from each of the plurality of satellites (12) utilizing one of the plurality of dedicated communications links, a method for providing high frequency data communications, the method comprising:

assigning an exclusive time interval to each of the plurality of dedicated communications links through which each of the plurality of user terminals (16) transmit and receive communications signals to and from each of the plurality of satellites (12); and transmitting and receiving the signals to and from each of the plurality of user terminals (16) via the plurality of communications satellites (12) utilizing one of the plurality of dedicated communications links at a primary range of frequencies.

26. The method as recited in claim 25 further comprising transmitting and receiving the signals to and from each of the user terminals at a secondary range of frequencies upon occurring a drop-out at the primary range of frequencies.

27. The method as recited in claim 26 further comprising circuit switching the signals received at the uplink antennas to a corresponding one of the downlink antennas based on the time interval.

28. The method as recited in claim 27 further comprising synchronizing each of the plurality of user terminals with each of the plurality of satellites.

29. The method as recited in claim 25 further comprising storing a routing table at each of the plurality of satellites for storing time interval data identifying each of the plurality of dedicated communications links for driving the uplink and downlink antenna beam switches.

30. The method as recited in claim 25 wherein the satellite-based communications network further includes a ground station for transmitting and receiving signals to and from each of the plurality of satellites and wherein the method further comprising transmitting reconfiguration signals to at least one of the plurality of satellites for updating the routing table for use in reconfiguring the subset of the plurality of coverage areas.

* * * * *